United States Patent [19]

Mlinaric

[11] 3,761,641

[45] Sept. 25, 1973

[54] MAGNETIC HEAD WITH DEMOUNTABLE FACE PART ASSEMBLY

[75] Inventor: Tony A. Mlinaric, San Carlos, Calif.

[73] Assignee: Ampex Corporation, Redwood City, Calif.

[22] Filed: June 25, 1971

[21] Appl. No.: 156,802

[52] U.S. Cl. ..... 179/100.2 C, 29/603, 340/174.1 F, 346/74 MC

[51] Int. Cl. ........ G11b 5/20, G11b 5/24, G11b 5/42

[58] Field of Search ............................ 179/100.2 C; 340/174.1 F; 346/74 MC

[56] References Cited

UNITED STATES PATENTS

| | | | |
|---|---|---|---|
| 3,353,261 | 12/1967 | Bradford et al. | 179/100.2 C |
| 3,605,259 | 9/1971 | Tawara et al. | 179/100.2 C |
| 3,557,266 | 1/1971 | Chiba et al. | 179/100.2 C |
| 3,577,634 | 5/1971 | Secrist | 179/100.2 C |
| 3,564,520 | 2/1971 | Michaud | 346/74 MC |

*Primary Examiner*—James W. Moffitt
*Assistant Examiner*—Alfred H. Eddleman
*Attorney*—Robert C. Clay

[57] ABSTRACT

The fabrication of a multi-track magnetic head assembly is disclosed wherein the assembly is initially formed in two distinct parts, a core housing part carrying a plurality of magnetic core elements and associated winding means, and a face part which carries the transducer pole tips and serves as the head-to-tape transducing surface. The union between the face part of the assembly and the core housing is formed by lapping the surfaces to be joined to a fine finish and assembling the parts such that the respective magnetic components engage one another to complete a magnetic circuit extending from the core element to the associated pole tips and thus through the transducing gaps defined thereby. In order to facilitate re-working of the assembly, the face part is secured to the core housing by only a strip of epoxy adhesive occupying a longitudinal groove in the surface of the core housing adjacent the mated surface of the face part. The face part may be removed for replacement by a simple cutting operation which releases the epoxy bond.

5 Claims, 13 Drawing Figures

INVENTOR.

[illegible]

BY

ATTORNEY

INVENTOR.
TONY A. MLINARIC
BY Larry L. Jackson
ATTORNEY

MAGNETIC HEAD WITH DEMOUNTABLE FACE PART ASSEMBLY

The present invention in general relates to magnetic transducers and in particular to a method of fabrication of a multi-track magnetic head assembly and to the resulting head structure.

In the manufacture of multi-track head assemblies adapted for high performance digital, audio and instrumentation tape transports, it is many times necessary to discard completed head stacks because of a defective transducing gap in one or more of the tracks. As the gap region of each assembly is very critical, it is not uncommon to find a high percentage of heads which must be rejected at or near the final stage of fabrication. The entire head assembly, due to its integrated structure, is lost even though the core and winding portions are without defect. In still other cases, the head assembly may be prematurely worn out due to the abrasive effects of tape at the head face, in which event the entire head assembly again must be discarded even though the remaining head components are functional.

In certain types of heads, the waste caused by the foregoing problems has been overcome by employing replaceable pole pieces, which in one way or another are removably secured to a core element. However, in the past, this type of replaceable pole tip construction has not been satisfactory for multi-track head assemblies wherein tracking and gap scatter tolerances require a greater rigidity in the head construction than afforded by replaceable pole piece mounting means.

Accordingly, it is an object of the present invention to provide a head assembly design and method of fabrication therefor, in which the pole pieces defining the critical gap region can be easily replaced without disturbing the core and winding components and yet at the same time provide the necessary mechanical rigidty demanded of a high performance multi-track head stack.

These and other objects are achieved in accordance with the present invention by a two part head assembly in which a face part, carrying the gap defining pole tips, is formed as a separate part for mounting on a core housing which carries an array of core members and winding means necessary to complete the magnetic circuits with each of the transducing gaps. Moreover, the face part is secured to the core housing by a longitudinal epoxy filled groove located in one or both of the surfaces mating the two parts, such that the face part can be readily removed for replacement by a simple cutting operation as described more fully hereinafter.

It is a further object of the present invention to provide a core element configuration for such head assembly which not only facilitates the above described fabrication but also uniquely accommodates the core windings.

These and other objects, features and advantages of the invention will become apparent from the following description and accompanying drawings describing and illustrating the preferred embodiment of the invention, wherein.

Figure 1:
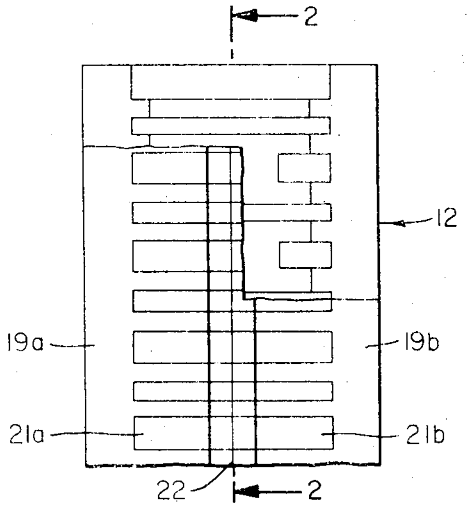
FIG. 1 is a front elevation view of the magnetic head assembly partially cut away for clarity.
Figure 2:
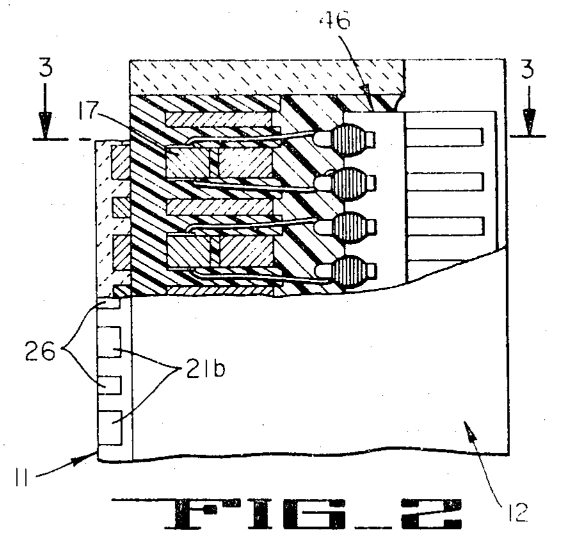
FIG. 2 is a side elevation view also partially cut away along section lines 2—2 of FIG. 1 to display the internal components of the assembly.
Figure 3:
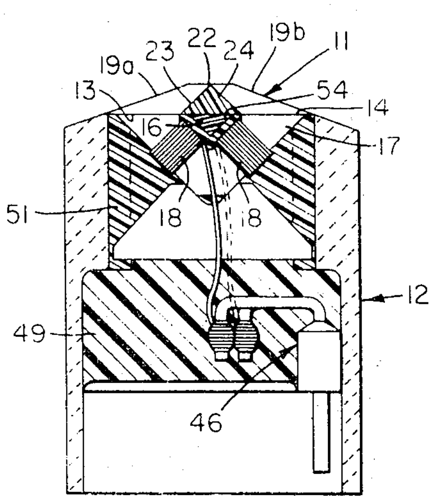
FIG. 3 is a section view of the head assembly taken along lines 3—3 of FIG. 2.

With reference to FIGS. 1, 2 and 3, the magnetic head assembly of the present invention is comprised of a face part 11 carrying the pole tips defining the transducing gaps for the various tracks and for engaging a magnetic recording medium, particularly a flexible web; and a core housing 12 carrying the core and winding means. Face part 11 is seated on housing 12 at mated planar surfaces 13 and 14 respectively, and secured thereto by means of a longitudinal strip 16 of epoxy adhesive. Face part 11, core housing 12 and adhesive strip 16 are arranged such that face part 11 can be readily removed from the core housing by grinding away a major portion of the face part and thereupon making a cut longitudinally with and extending into strip 16 so as to release the adhesive bond between the two parts. In this manner, a defective face part 11 can be removed without damaging core housing 12 or the finished planar surface 14 thereof. A new part 11 may thereupon be installed on the core housing and bonded thereto by a new strip of epoxy adhesive.

The magnetic circuits for each head track transducer are completed by means of registration and physical engagement between the pole pieces and core elements at the mated surfaces 13 and 14 respectively of face part 11 and core housing 12.

Housing 12, which carries a plurality of core members 17 and windings 18 thereon, constitutes a substantial portion of the total manufacturing cost of the assembly and generally exhibits a long useful life due to the absence of any abrasive wear. By permitting the reuse of the core housing subassembly, either during the original manufacturing stages, or after some use of the head assembly, a significant cost savings is realized.

In this instance, face part 11 is formed of a pair of ceramic half members **19*a* and 19*b*, each carrying one-half set of a plurality of magnetic pole pieces 21*a* and 21*b* arranged to abut in pairs at a gap line 22. To define the depth of each of the nonmagnetic gaps bridging each pair of registering pole pieces 21*a* and 21*b*, face part 11 is formed with a cut away region directly beneath gap line 22 in the shape of a wedge groove 23 having its apex running generally coincidentally with gap line 22. As discussed more fully hereinafter, groove 23 is filled with a plurality of wedge shaped nonmagnetic ceramic segments 24 for structural reinforcement. Additionally, face part 11 carries a plurality of shield segments 26** which are integral members bridging the two portions of the face part and serving as intertrack shields.

In fabricating the head assembly discussed herein, the individual pole pieces are glass bonded to the ceramic half portions **19*a* and 19*b* of face part 11 in accordance with the invention disclosed and claimed in U.S. application for Pat. Ser. No. 156,801 by William Louis Kroon, entitled MAGNETIC HEAD AND METHOD OF MANUFACTURE THEREOF, filed June 25, 1971. Furthermore, as disclosed in that application, the material for portions 19*a* and 19*b* of part 11 are preferably of a Forsterite ceramic ($2MgO \cdot SiO_2$ — available from Minnesota Mining and Manufacturing Company and General Electric Company), however, a nonmagnetic ferrite ceramic material may be employed. The pole pieces are of a magnetic ferrite and preferably a ferrite formed by a hot press process. The members 19a and 19b, the ferrite pole pieces 21a and 21**b and the glass bonding material are all selected to have a coefficient of thermal expansion within 20 percent of one another for the reasons noted in the above application Ser. No. 156,801.

Figures 5A, 5B, 5C, 5D, 5E, 5F, 5G, 5H, 5I:
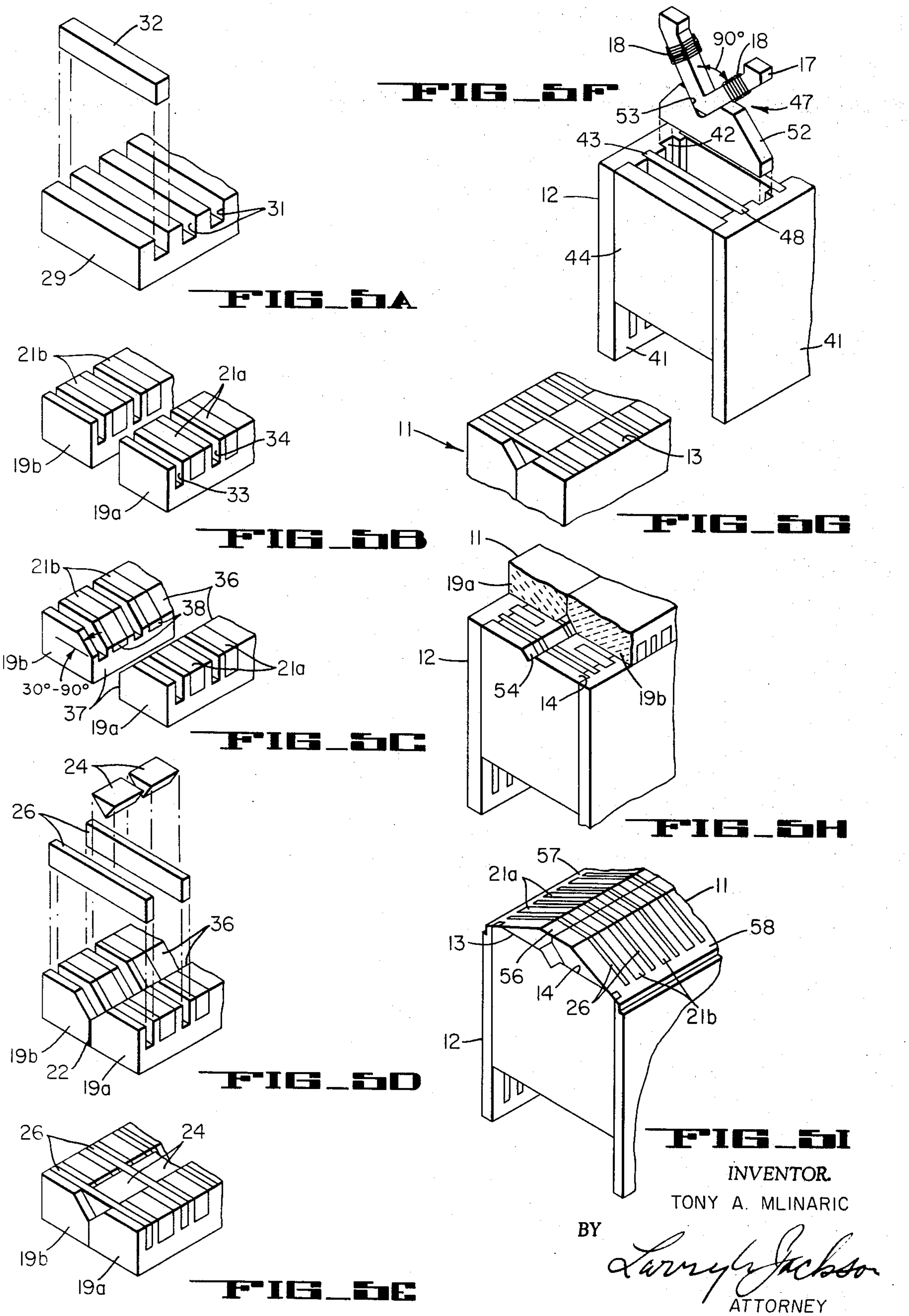
FIGS. 5A–5I illustrate the various steps involved in the method of constructing the head assembly in accordance with the present invention.

With reference to FIGS. 5A through 5I, the head assembly is fabricated in the following manner. Face part 11 is formed by starting with a block 29 of nonmagnetic ceramic material, such as Forsterite and as shown in FIG. 5A, forming a plurality of space parallel slots 31 of rectangular cross section. An elongate rectangular cross section slug 32 of magnetic ferrite material is disposed in each of slots 31 and secured therein, preferably by a glass bonding as per above. Thereupon, shield receiving slots are formed at the ends of the block assembly and between and parallel to each of the mounted ferrite slugs, such as shown by slots 33 and 34 respectively, and the block is thereafter severed into two half portions along a plane normal to and bisecting the longitudinal dimensions of ferrite slugs 32 as illustrated. These two half portions are to become half members 19a and 19b constituting face part 11, and the severed sections of ferrite slugs 32 will become the various pole pieces 21a and 21b. At this stage, the face part components appear as shown by FIG. 5B. two portions assembled material abutting Maintaining the same orientation of the parts as shown in FIG. 5B, each half portion 19a and 19b is provided with a 30° to 90° (in this instance 45°) beveled edge 36 which will form groove 23 underlying the gap line 22 of the finished face part 11. In the alternative, only one of portions 19a and b may be provided with a bevelled edge such that the groove is asymmetrical relative to the gap line. With the parts still separated, a nonmagnetic material (not shown) is disposed on one or both of the confronting faces 37 of half members 19a and b, and the twoportions moved to an assenbled condition with faces 37 abutting at the nonmagnetic maaterial spacer. The nonmagnetic material forms a gap between the otherwise aubtting face segments of pole pieces 21a and 21b, such as face segments 38 and eventually defines the nonmagnetic transducing gaps along gap line 22. The nonmagnetic material may be provided by a number of well known techniques but in this instance is preferably formed of a layer of sputtered nonmagnetic material, such as Aluminum Oxide ($AL_2O_3$). Typical gap lengths (corresponding to the thickness of the deposited material) may range from 1 or 2 $\mu$ inches to 150 $\mu$ inches.

The subassembly now appears as in FIG. 5D and, at this stage, the groove defined by beveled edges 36 receives the plurality of wedge shaped ceramic segments 24, preferably also of Forsterite material, and the plurality of magnetic shield members 26 which are formed of a magnetic ferrite material. Members 26 and segments 24 serve to unite the two half members 19a and 19b into a rigid integral subassembly. As best illustrated in FIG. 5E, segments 24 occupy the region between each adjacent pair of shield members 26 such that a substantial portion of the groove volume is occupied by these members. Suitable adhesive or bonding means can be employed to secure shield members 26 and ceramic segments 24, such as an epoxy — Able Stick available from Able Stick Laboratories, Inc. Alternatively, if desired, segments 24 and members 26 may be glass bonded to the contacting surfaces of members 19a and 19b and pole pieces 21a and 21b using a lower temperature glass flux than employed for the glass bonding of ferrite slugs 32. The remaining free space regions adjacent segments 24 and members 26 may be filled with an adhesive epoxy such that the face part assembly appears as in FIG. 5G. The portions of members 19a and 19b exposing the various magnetic parts is to form mating surface 13 of face part 11 as shown.

With reference to FIG. 5F, core housing 12 is fabricated by shaping a pair of side pieces 41 to include a plurality of alternately spaced core receiving and shield receiving slots 42 and 43 respectively. Side pieces 41 are thereupon assembled and epoxied to a pair of end pieces, one of which is shown as end piece 44. One of side pieces 41 carries a connector terminal assembly 46 as best shown in FIG. 3. Preferably, the material used in forming side pieces 41 and end pieces 44 has a coefficient of thermal expansion substantially matching that of the materials forming face part 11, and thus in this instance and preferably the pieces 41 and 44 are of a Forsterite ceramic material.

An alternative process calls for forming core housing 12 in a single step precision molding operation using a castable material which has a coefficient of thermal expansion in the same range as that of the Fosterite material. A suitable moldable material is a mica-glass composition available from Mycalex Corp. of America, Clifton, N.J., identified as precision molding mycalex grade 410.

At this point in the assembly operation, core assemblies 47 each including a core member 17 and windings 18, and shield members 48 are installed in their respective slots 42 and 43 and secured therein with a suitable epoxy bonding material. The lower portion of the core housing assembly is now potted using a nonrigid potting compound 49 such as RTV (No. 8111 and curing agent NUOCURE No. 28 available from General Electric). The upper portion of the assembly is now filled with an epoxy which cures to a rigid body 51.

In accordance with the present invention, core members 17 are of a V-shaped configuration and disposed to carry windings 18 on each leg thereof. It has been found that this geometry serves to provide a reasonably short magnetic circuit path through the core member and at the same time affords room to wind a relatively large number of turns on each core arm. Furthermore, these objectives are best met by shaping core members 17 to have substantially a 90° angle between its respective branches.

To facilitate the disposition of windings 18 on core members 17 and installation of the member into core housing 12, the present invention in its preferred form provides for the production of core assemblies 47 in the following manner. An elongate section of magnetic core material, preferably of a magnetic ferrite, is produced having a V-shaped cross section (in the shape of the ultimate core member 17). This V-bar is mounted on an elongate saddle member, formed of a suitable rigid insulating material, and having a cross section in the form of saddle 52 as shown in FIG. 5F. The V-shaped bar is epoxy bonded at heel 53 to the saddle member and the assembly is thereupon cut into a plurality section normal to the length thereof so as to form the core and saddle assembly 47 as illustrated. This assembly can be arranged on a machine for automatic winding of windings 18.

Core members 17 are preferably of a magnetic ferrite material because of the advantageous electro-magnetic characteristics thereof. However, it has been found that shields 48 when formed of laminated mu-metal, a soft magnetic material, provide greater magnetic shielding than a ferrite material of the same thickness. Thus, shields 48 are made in this instance of laminated mu-metal. The shield members carried by face part 11 and disposed to engage and magnetically unite with the shields 48 carried by the core housing as described more fully herein, are formed of a magnetic ferrite material due to the greater durability thereof under the effects of abrasive tape wear. Furthermore, in situations where shield members 26 are glass bonded to the ceramic half members 19*a* and 19*b* with the use of a two stage glass bonding operation as discussed above, then of course it is very desirable that members 26 be of a ferrite material in order to accommodate the glass bond.

Having completed the assembly and potting of core housing 12, the upper planar surface 14 thereof is finished to a fine polish and a longitudinal V-shaped groove 54 is cut into surface 14, lengthwise of the assembly and having sides parallel to but spaced from the V-shaped trough outlined by core members 17 and the windings 18 thereof as best illustrated in FIG. 3. V-shaped groove 54 serves to contain the epoxy material providing strip 16 of the epoxy bond securing face part 11 to housing 12.

In order to provide intimate physical engagement between the magnetic core and shield parts carried by housing 12 and the pole pieces and shield members of face part 11, the mating surfaces 13 and 14 thereof are polished to a fine finish — on the order of one lightband or approximately 10 $\mu$ inches flatness.

With face part 11 disposed on housing 12 and the various magnetic parts in registration, a liquid epoxy is forced into groove 54 and the assembly is cured. The assembled housing 12 and face part 11 now appear as illustrated in FIG. 5H, and part 11 is ready for contouring. The contouring cuts the upper regions of ceramic portions 19*a* and 19*b* so as to expose the various pole pieces and shield members as indicated in FIG. 5I. It will be observed that the contouring results in the formation of three generally planar surfaces. A gap region surface 56 is provided which exposes the nonmagnetic transducing gaps formed between each pair of pole pieces and extends parallel to the mating surfaces 13 and 14 between face part 11 and core housing 12. Slanting away from surface 56 are surfaces 57 and 58 which, in this instance, cut into the lateral edges of core housing 12.

Figure 4:
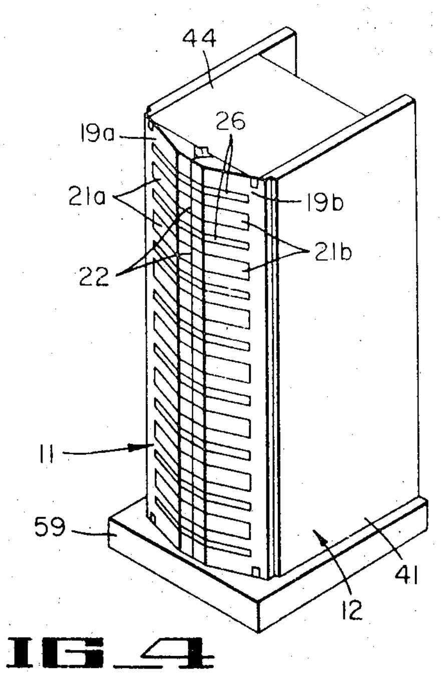
FIG. 4 is a perspective view of the magnetic head assembly.

The assembly at this point is substantially complete requiring only the installation of a mounting block 59 as shown by FIG. 4. Block 59 may be of aluminum and is secured to a suitably lapped end face of housing 12 by an epoxy adhesive.

What is claimed is:

1. A magnetic head assembly comprising a core housing carrying a plurality of core members with winding means thereon and separated by a first plurality of magnetic shield members, said core members with winding means and first shield members joined together to form an integral assembly, and a face part carrying a plurality of pairs of magnetic pole pieces with each pair arranged to define a transducing gap with each pair separated by a second plurality of magnetic shield members, said pole pieces and second shield members joined together to form an integral assembly, said face part assembly and core housing assembly having mated planar surfaces at which portions of the core members and first shield members respectively engage registering portions of the pole pieces and second shield members to complete a shielded magnetic circuit extending through each transducing gap, a longitudinal groove formed in at least one of said planar surfaces underlying said transducing gaps, and an adhesive material filling said groove and demountably securing said core housing assembly to said face part assembly solely at the groove region to allow the face part assembly to be replaced by removing the adhesive material in the groove.

2. The magnetic head assembly of claim 1, further defined by said longitudinal groove being formed in the planar surface of said core housing assembly.

3. The head assembly as set forth in claim 2, wherein said longitudinal groove is further defined as having a V-shaped cross section.

4. The head assembly as defined in claim 3, said core members each being V-shaped and disposed in said housing with their troughs aligned so as to outline the location of said V-shaped groove.

5. The head assembly as defined in claim 4, wherein said V-shaped core members have an angle of the order of 90°, and said coil means comprises a pair of coils for each core member, each coil being wound around one leg of the V-shaped core member.

* * * * *